United States Patent
Ito et al.

(10) Patent No.: US 12,529,870 B2
(45) Date of Patent: Jan. 20, 2026

(54) OPTICAL SYSTEM, OPTICAL APPARATUS, AND METHOD FOR MANUFACTURING OPTICAL SYSTEM

(71) Applicant: Nikon Corporation, Tokyo (JP)

(72) Inventors: Tomoki Ito, Tokyo (JP); Takuto Takemoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 752 days.

(21) Appl. No.: 17/800,220

(22) PCT Filed: Jan. 12, 2021

(86) PCT No.: PCT/JP2021/000725
§ 371 (c)(1),
(2) Date: Aug. 16, 2022

(87) PCT Pub. No.: WO2021/166492
PCT Pub. Date: Aug. 26, 2021

(65) Prior Publication Data
US 2023/0064040 A1    Mar. 2, 2023

(30) Foreign Application Priority Data
Feb. 19, 2020    (JP) ................ 2020-026501

(51) Int. Cl.
G02B 13/00    (2006.01)
G02B 27/00    (2006.01)

(52) U.S. Cl.
CPC ..... G02B 13/0045 (2013.01); G02B 27/0025 (2013.01)

(58) Field of Classification Search
CPC ................ G02B 13/0045; G02B 27/0025
See application file for complete search history.

(56) References Cited

U.S. PATENT DOCUMENTS

2017/0371134 A1* 12/2017 Huang .............. H04N 25/76
2019/0154966 A1   5/2019 Nitta

FOREIGN PATENT DOCUMENTS

| CN | 201383031 Y | 1/2010 |
| CN | 106443987 A | 2/2017 |
| CN | 110456490 A | 11/2019 |
| CN | 210015287 U | 2/2020 |
| JP | H04-174808 A | 6/1992 |

(Continued)

OTHER PUBLICATIONS

Robert Fischer; Biljana Tadic-Galeb; Paul Yoder: Optical System Design, Second Edition. Optical Manufacturing Considerations, Chapter (McGraw-Hill Professional, 2008), AccessEngineering (Year: 2008).*

(Continued)

*Primary Examiner* — Nathanael R Briggs
(74) *Attorney, Agent, or Firm* — Potomac Law Group, PLLC (57) ABSTRACT

An optical system is configured to include a plurality of lenses such that a final lens closest to an image side of the lenses includes a lens surface having a pole and that the following conditional expression is satisfied: $0.20<k/h<0.50$, where k is the height of the pole from an optical axis, and h is the effective radius of the lens surface having a pole. The optical system can be used for an optical apparatus, such as a camera 1.

18 Claims, 6 Drawing Sheets

(56) References Cited

FOREIGN PATENT DOCUMENTS

| | | | |
|---|---|---|---|
| JP | 2000-330014 A | | 11/2000 |
| JP | 2010145648 A | * | 7/2010 |
| JP | 2019-003059 A | | 1/2019 |

OTHER PUBLICATIONS

Office Action issued Jun. 20, 2023, in Japanese Patent Application No. 2022-501694.
Office Action issued May 11, 2023, in Chinese Patent Application No. 202180014323.4.
International Search Report from International Patent Application No. PCT/JP2021/000725, Mar. 30, 2021.
Written Opinion of the International Searching Authority from International Patent Application No. PCT/JP2021/000725, Mar. 30, 2021.

* cited by examiner

OPTICAL SYSTEM, OPTICAL APPARATUS, AND METHOD FOR MANUFACTURING OPTICAL SYSTEM

FIELD

The present invention relates to an optical system, an optical apparatus, and a method for manufacturing an optical system.

BACKGROUND

Optical systems used for cameras for photographs, electronic still cameras, video cameras and the like have been proposed (see, e.g., Patent Literature 1).

CITATION LIST

Patent Literature

Patent Literature 1: Japanese Unexamined Patent Publication No. 2019-003059

SUMMARY

An optical system of the present disclosure includes a plurality of lenses; a final lens closest to an image side of the lenses includes a lens surface having a pole; and the following conditional expression is satisfied:

$$0.20 < k/h < 0.50$$

where
k denotes the height of the pole from an optical axis, and
h denotes the effective radius of the lens surface having a pole.

A pole in the present disclosure refers to a point on a lens surface, other than on an optical axis, at which the tangent plane of the lens surface crosses the optical axis perpendicularly.

A method for manufacturing an optical system of the present disclosure includes a plurality of lenses; a final lens closest to an image plane of the lenses includes a lens surface having a pole; and the following conditional expression is satisfied:

$$0.20 < k/h < 0.50$$

where
k denotes the height of the pole from an optical axis, and
h denotes the effective radius of the lens surface having a pole.

DESCRIPTION OF EMBODIMENTS

The following describes an optical system, an optical apparatus, and a method for manufacturing an optical system of an embodiment of the present application.

An optical system of the present embodiment includes a plurality of lenses; and a final lens closest to an image side of the lenses includes a lens surface having a pole.

The optical system of the present embodiment having such a configuration can correct astigmatism and distortion favorably.

Additionally, the optical system of the present embodiment satisfies the following conditional expression:

$$0.20 < k/h < 0.50 \quad (1)$$

where
k denotes the height of the pole from an optical axis, and
h denotes the effective radius of the lens surface having a pole.

The optical system of the present embodiment satisfying conditional expression (1) can correct astigmatism and distortion favorably. The effect of the present embodiment can be further ensured by setting k/h in conditional expression (1) greater than 0.20. To further ensure the effect of the present embodiment, the lower limit of conditional expression (1) is preferably set at 0.21 or 0.23, more preferably at 0.24.

The effect of the present embodiment can be further ensured by setting k/h in conditional expression (1) less than 0.50. To further ensure the effect of the present embodiment, the upper limit of conditional expression (1) is preferably set at 0.48, 0.45, 0.43, 0.40, 0.38, or 0.36, more preferably at 0.35.

A small-sized optical system of favorable optical performance can be achieved by the above configuration.

The optical system of the present embodiment preferably satisfies the following conditional expression:

$$-1.00 < f/fk < 1.00 \quad (2)$$

where
fk denotes the focal length of the lens having a pole, and
f denotes the focal length of the whole optical system.

The optical system of the present embodiment satisfying conditional expression (2) can prevent increase in spherical aberration. The effect of the present embodiment can be further ensured by setting f/fk in conditional expression (2) greater than −1.00. To further ensure the effect of the present embodiment, the lower limit of conditional expression (2) is preferably set at −0.95, −0.90, −0.85, −0.80, −0.75, −0.70, −0.65, −0.50, −0.35, −0.20, or −0.10, more preferably at 0.10.

The effect of the present embodiment can be further ensured by setting f/fk in conditional expression (2) less than 1.00. To further ensure the effect of the present embodiment, the upper limit of conditional expression (2) is preferably set at 0.95, 0.90, 0.85, 0.80, 0.75, 0.70, 0.65, 0.60, or 0.55, more preferably at 0.50.

The optical system of the present embodiment preferably satisfies the following conditional expression:

$$0.50 < f/TL < 0.80 \quad (3)$$

where
- f denotes the focal length of the whole optical system, and
- TL denotes the total optical length of the whole optical system.

The optical system of the present embodiment can be downsized by setting the ratio of the focal length of the whole optical system to the total optical length of the whole optical system in conditional expression (3) greater than the lower limit. The effect of the present embodiment can be further ensured by setting f/TL in conditional expression (3) greater than 0.50. To further ensure the effect of the present embodiment, the lower limit of conditional expression (3) is preferably set at 0.53, 0.55, 0.58, 0.60, 0.63, 0.65, or 0.68, more preferably at 0.70.

The optical system of the present embodiment can correct curvature of field appropriately by setting the ratio of the focal length of the whole optical system to the total optical length of the whole optical system in conditional expression (3) less than the upper limit. The effect of the present embodiment can be further ensured by setting f/TL in conditional expression (3) less than 0.80. To further ensure the effect of the present embodiment, the upper limit of conditional expression (3) is preferably set at 0.79 or 0.78, more preferably at 0.77.

The optical system of the present embodiment preferably satisfies the following conditional expression:

$$10.00 < f^2/TL \tag{4}$$

where
- f denotes the focal length (mm) of the whole optical system, and
- TL denotes the total optical length (mm) of the whole optical system.

The optical system of the present embodiment satisfying conditional expression (4) can reduce eccentric coma aberration caused by manufacturing error. The effect of the present embodiment can be further ensured by setting $f^2/TL$ in conditional expression (4) greater than 10.00. To further ensure the effect of the present embodiment, the lower limit of conditional expression (4) is preferably set at 11.50, 12.00, 13.00, 13.50, 14.00, 14.50, 15.00, or 15.50, more preferably at 16.00.

The optical system of the present embodiment preferably satisfies the following conditional expression:

$$-3.00 < PPo/PCo < -0.01 \tag{5-1}$$

where
- PPo denotes refractive power at a position where a principal ray at a maximum image height passes through an object-side lens surface for the case that the final lens has a pole on the object-side lens surface, and
- PCo denotes refractive power near the center of the object-side lens surface for the case that the final lens has a pole on the object-side lens surface.

The optical system of the present embodiment satisfying conditional expression (5-1) can correct off-axis aberrations favorably. The effect of the present embodiment can be further ensured by setting PPo/PCo in conditional expression (5-1) greater than −3.00. To further ensure the effect of the present embodiment, the lower limit of conditional expression (5-1) is preferably set at −2.80, −2.50, or −2.40, more preferably at −2.30.

The effect of the present embodiment can be further ensured by setting PPo/PCo in conditional expression (5-1) less than −0.01. To further ensure the effect of the present embodiment, the upper limit of conditional expression (5-1) is preferably set at −0.05 or −0.10, more preferably at −0.15.

The optical system of the present embodiment preferably satisfies the following conditional expression:

$$-3.00 < PPi/PCi < -0.01 \tag{5-2}$$

where
- PPi denotes refractive power at a position where a principal ray at a maximum image height passes through an image-side lens surface for the case that the final lens has a pole on the image-side lens surface, and
- PCi denotes refractive power near the center of the image-side lens surface for the case that the final lens has a pole on the image-side lens surface.

The optical system of the present embodiment satisfying conditional expression (5-2) can correct off-axis aberrations favorably. The effect of the present embodiment can be further ensured by setting PPi/PCi in conditional expression (5-2) greater than −3.00. To further ensure the effect of the present embodiment, the lower limit of conditional expression (5-2) is preferably set at −2.80, −2.50, or −2.40, more preferably at −2.30.

The effect of the present embodiment can be further ensured by setting PPi/PCi in conditional expression (5-2) less than −0.01. To further ensure the effect of the present embodiment, the upper limit of conditional expression (5-2) is preferably set at −0.05 or −0.10, more preferably at −0.15.

The optical system of the present embodiment preferably satisfies the following conditional expression:

$$-0.20 < PPbo/PCbo < 2.00 \tag{6-1}$$

where
- PPbo denotes refractive power at a position where a principal ray at a maximum image height passes through an object-side lens surface of a lens adjacent to the final lens on an object side, and
- PCbo denotes refractive power near the center of the object-side lens surface of the lens adjacent to the final lens on the object side.

The optical system of the present embodiment satisfying conditional expression (6-1) can correct off-axis aberrations favorably. The effect of the present embodiment can be further ensured by setting PPbo/PCbo in conditional expression (6-1) greater than −0.20. To further ensure the effect of the present embodiment, the lower limit of conditional expression (6-1) is preferably set at −0.15, −0.10, or −0.05, more preferably at −0.01.

The effect of the present embodiment can be further ensured by setting PPbo/PCbo in conditional expression (6-1) less than 2.00. To further ensure the effect of the present embodiment, the upper limit of conditional expression (6-1) is preferably set at 1.90 or 1.80, more preferably at 1.70.

The optical system of the present embodiment preferably satisfies the following conditional expression:

$$-0.20 < PPbi/PCbi < 2.00 \tag{6-2}$$

where
- PPbi denotes refractive power at a position where a principal ray at a maximum image height passes through an image-side lens surface of a lens adjacent to the final lens on an object side, and
- PCbi denotes refractive power near the center of the image-side lens surface of the lens adjacent to the final lens on the object side.

The optical system of the present embodiment satisfying conditional expression (6-2) can correct off-axis aberrations favorably. The effect of the present embodiment can be further ensured by setting PPbi/PCbi in conditional expression (6-2) greater than −0.20. To further ensure the effect of the present embodiment, the lower limit of conditional expression (6-2) is preferably set at −0.15, −0.10, or −0.05, more preferably at −0.01.

The effect of the present embodiment can be further ensured by setting PPbi/PCbi in conditional expression (6-2) less than 2.00. To further ensure the effect of the present embodiment, the upper limit of conditional expression (6-2) is preferably set at 1.90 or 1.80, more preferably at 1.70.

The optical system of the present embodiment preferably satisfies the following conditional expression:

$$-1.00 < 1/q < 1.00 \tag{7}$$

where
q denotes the shape factor of a lens being adjacent to the final lens on an object side and including a convex lens surface on the image side.

The optical system of the present embodiment satisfying conditional expression (7) can correct off-axis aberrations favorably. The effect of the present embodiment can be further ensured by setting 1/q in conditional expression (7) greater than −1.00. To further ensure the effect of the present embodiment, the lower limit of conditional expression (7) is preferably set at −0.90, −0.80, −0.70, −0.65, −0.60, −0.55, or −0.50, more preferably at −0.45.

The effect of the present embodiment can be further ensured by setting 1/q in conditional expression (7) less than 1.00. To further ensure the effect of the present embodiment, the upper limit of conditional expression (7) is preferably set at 0.90, 0.80, 0.70, 0.60, 0.50, 0.45, 0.40, 0.35, 0.30, 0.25, or 0.20, more preferably at 0.15.

In the optical system of the present embodiment, the lens surface of the final lens having a pole preferably has a positive curvature near the pole.

The optical system of the present embodiment having such a configuration can correct off-axis aberrations favorably.

The optical system of the present embodiment preferably further includes an aperture stop and satisfies the following conditional expression:

$$0.80 < SL/TL < 1.00 \tag{8}$$

where
SL denotes the length in the optical system from the aperture stop to an image plane, and
TL denotes the total optical length of the whole optical system.

The optical system of the present embodiment satisfying conditional expression (8) can correct distortion and chromatic aberration effectively. The effect of the present embodiment can be further ensured by setting SL/TL in conditional expression (8) greater than 0.80. To further ensure the effect of the present embodiment, the lower limit of conditional expression (8) is preferably set at 0.82 or 0.84, more preferably at 0.85.

The effect of the present embodiment can be further ensured by setting SL/TL in conditional expression (8) less than 1.00. To further ensure the effect of the present embodiment, the upper limit of conditional expression (8) is preferably set at 0.98 or 0.97, more preferably at 0.96.

The optical system of the present embodiment preferably satisfies the following conditional expression:

$$6.00 < BF \tag{9}$$

where
BF denotes the back focus (mm) of the optical system.

The optical system of the present embodiment satisfying conditional expression (9) can bring an exit pupil closer to the object side to bring the direction of incidence onto the image plane closer to the normal direction, and can correct astigmatic difference effectively. The effect of the present embodiment can be further ensured by setting BF in conditional expression (9) greater than 6.00. To further ensure the effect of the present embodiment, the lower limit of conditional expression (9) is preferably set at 7.00, 7.50, 7.80, 8.00, 8.40, or 8.80, more preferably at 9.00.

The optical system of the present embodiment preferably satisfies the following conditional expression:

$$0.30 < BF/f < 0.70 \tag{10}$$

where
BF denotes the back focus of the optical system, and
f denotes the focal length of the whole optical system.

The optical system of the present embodiment can bring an exit pupil closer to the object side to bring the direction of incidence onto the image plane closer to the normal direction, and can correct astigmatic difference effectively, by setting the ratio of the back focus of the optical system to the focal length of the whole optical system in conditional expression (10) greater than the lower limit. The effect of the present embodiment can be further ensured by setting BF/f in conditional expression (10) greater than 0.30. To further ensure the effect of the present embodiment, the lower limit of conditional expression (10) is preferably set at 0.32 or 0.34, more preferably at 0.35.

The optical system of the present embodiment can prevent increase in distortion caused by symmetry breaking of the optical system, by setting the ratio of the back focus of the optical system to the focal length of the whole optical system in conditional expression (10) less than the upper limit. The effect of the present embodiment can be further ensured by setting BF/f in conditional expression (10) less than 0.70. To further ensure the effect of the present embodiment, the upper limit of conditional expression (10) is preferably set at 0.68, 0.66, or 0.65, more preferably at 0.63.

The optical system of the present embodiment preferably satisfies the following conditional expression:

$$1.50 < TL/BF < 5.00 \tag{11}$$

where
TL denotes the total optical length of the whole optical system, and
BF denotes the back focus of the optical system.

The optical system of the present embodiment can prevent increase in distortion caused by symmetry breaking of the optical system, by setting the ratio of the total optical length of the whole optical system to the back focus of the optical system in conditional expression (11) greater than the lower limit. The effect of the present embodiment can be further ensured by setting TL/BF in conditional expression (11) greater than 1.50. To further ensure the effect of the present embodiment, the lower limit of conditional expression (11) is preferably set at 1.60, 1.70, 1.80, 1.85, 1.90, 1.95, 2.00, or 2.05, more preferably at 2.10.

The optical system of the present embodiment can bring an exit pupil closer to the object side to bring the direction of incidence onto the image plane closer to the normal direction, and can further correct distortion and chromatic aberration effectively, by setting the ratio of the total optical length of the whole optical system to the back focus of the optical system in conditional expression (11) less than the upper limit. The effect of the present embodiment can be further ensured by setting TL/BF in conditional expression (11) less than 5.00. To further ensure the effect of the present embodiment, the upper limit of conditional expression (11) is preferably set at 4.80, 4.50, 4.30, 4.00, 3.90, 3.80, or 3.75, more preferably at 3.70.

The optical system of the present embodiment preferably satisfies the following conditional expression:

$$1.70 < nd \tag{12}$$

where nd denotes the highest of refractive indices of lenses included in the optical system.

The optical system of the present embodiment satisfying conditional expression (12) can correct axial and off-axis aberrations favorably. The effect of the present embodiment can be further ensured by setting nd in conditional expression (12) greater than 1.70. To further ensure the effect of the present embodiment, the lower limit of conditional expression (12) is preferably set at 1.73, 1.75, 1.77, or 1.80, more preferably at 1.83.

The optical system of the present embodiment preferably includes at least one cemented lens.

The optical system of the present embodiment having such a configuration can correct chromatic aberration and curvature of field favorably.

An optical apparatus of the present embodiment includes the optical system having the above configuration. This enables achieving a small-sized optical apparatus of favorable optical performance.

A method for manufacturing an optical system of the present embodiment includes configuring an optical system including a plurality of lenses, of which a final lens closest to an image plane includes a lens surface having a pole, so that the following conditional expression (1) is satisfied:

$$0.20 < k/h < 0.50 \tag{1}$$

where k denotes the height of the pole from an optical axis, and
h denotes the effective radius of the lens surface having a pole.

A small-sized optical system of favorable optical performance can be manufactured by such a method for manufacturing an optical system.

NUMERICAL EXAMPLES

Examples of the present application will be described below with reference to the drawings.

First Example

Figure 1:
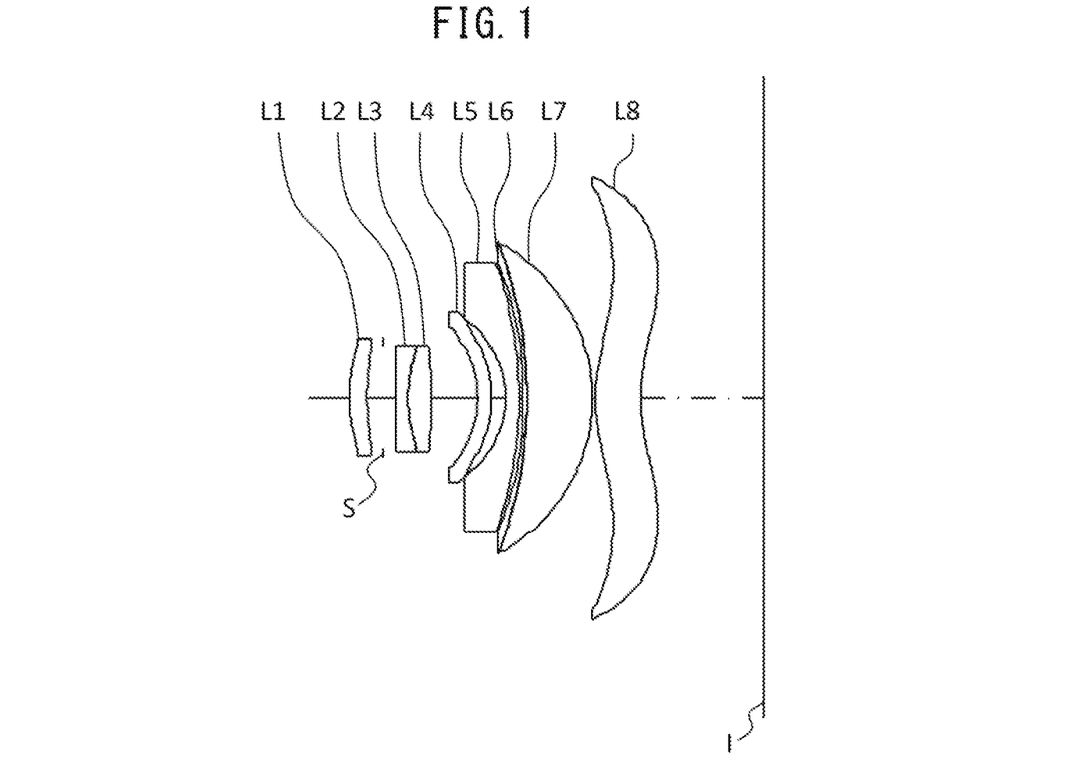
FIG. 1 is a cross-sectional view of an optical system of a first example.

FIG. 1 is a cross-sectional view of an optical system of a first example.

The optical system of the present example includes a positive meniscus lens L1 convex on the object side; an aperture stop S; a positive cemented lens composed of a negative meniscus lens L2 convex on the object side and a biconvex positive lens L3; a negative meniscus lens L4 convex on the image side; a negative meniscus lens L5 convex on the image side; a positive cemented lens composed of a positive meniscus lens L6 convex on the image side and a positive meniscus lens L7 convex on the image side; and a positive meniscus lens L8 convex on the object side, in order from the object side.

On an image plane I is disposed an imaging device (not shown) constructed from CCD, CMOS or the like.

Table 1 below shows specifications of the optical system of the present example. In Table 1, f denotes the focal length of the whole optical system at focusing on infinity, F.no the f-number at focusing on infinity, TL the length of the whole optical system at focusing on infinity, and BF the back focus.

In [Lens specifications], m denotes the positions of the optical surfaces counted from the object side, r the radii of curvature, d the surface-to-surface distances, nd the refractive indices for d-line (wavelength 587.6 nm), and νd the Abbe numbers for d-line. In [Lens specifications], the radius of curvature r=∞ means a plane. In [Lens specifications], the optical surfaces with "*" are aspherical surfaces.

In [Aspherical surface data], ASP denotes the optical surface corresponding to the aspherical surface data, K the conic constant, and A4 to A20 the spherical constants.

The aspherical surfaces are expressed by expression (a) below, where the height in the direction perpendicular to the optical axis is denoted by y, the distance along the optical axis from the tangent plane at the vertex of an aspherical surface to the aspherical surface at height y (a sag) by S(y), the radius of curvature of a reference sphere (paraxial radius of curvature) by r, the conic constant by K, and the nth-order aspherical coefficient by An. In the examples, the second-order aspherical coefficient A2 is 0. "E-n" denotes "×10$^{-n}$."

$$S(y) = (y^2/r)/\{1+(1-K \times y^2/r^2)^{1/2}\} + A4 \times y^4 + A6 \times y^6 + A8 \times y^8 + A10 \times y^{10} + A12 \times y^{12} + A14 \times y^{14} + A16 \times y^{16} + A18 \times y^{18} + A20 \times y^{20} \tag{a}$$

The unit of the focal lengths f, the radii of curvature r, and the other lengths listed in Table 1 is "mm." However, the unit is not limited thereto because the optical performance of a proportionally enlarged or reduced optical system is the same as that of the original optical system.

The above reference symbols in Table 1 will also be used similarly in the tables of the other examples described below.

In the present example, any of the object-side and image-side lens surfaces of the positive meniscus lens L8, which is the final lens, corresponds to the lens surface having a pole. The positive meniscus lens L7 corresponds to the lens being adjacent to the final lens on an object side and including a convex lens surface on the image side.

TABLE 1

| [General specifications] | |
|---|---|
| f | 22.600 |
| F. no | 2.900 |
| TL | 31.310 |
| BF | 9.186 |

| [Lens specifications] | | | | |
|---|---|---|---|---|
| m | r | d | nd | νd |
| * 1) | 11.1905 | 1.3161 | 1.883000 | 40.66 |
| * 2) | 17.5187 | 1.1619 | | |
| 3) | ∞ | 0.9096 | (aperture stop) | |
| 4) | 1010.8659 | 1.0000 | 1.805180 | 25.45 |
| 5) | 11.8488 | 1.7300 | 1.834810 | 42.73 |
| 6) | −27.8058 | 3.3919 | | |
| * 7) | −8.9877 | 1.0000 | 1.544502 | 55.99 |
| * 8) | −10.5658 | 1.0926 | | |
| 9) | −7.1127 | 1.0000 | 1.647690 | 33.72 |
| 10) | −30.1949 | 0.2890 | | |
| * 11) | −39.1623 | 0.3000 | 1.560930 | 36.64 |
| 12) | −32.4038 | 4.8182 | 1.883000 | 40.66 |
| 13) | −13.0880 | 0.2000 | | |
| * 14) | 12.0877 | 3.3730 | 1.544502 | 55.99 |
| * 15) | 12.4265 | BF | | |

[Aspherical surface data]

TABLE 1-continued

ASP: 1st surface

K: 0.438
A4: −1.246E−01 A6: −1.401E−02 A8: −1.001E−03 A10: 2.591E−06
A12: −2.364E−06
ASP: 2nd surface K: 3.000
A4: −1.662E−01 A6: −1.305E−02 A8: −3.423E−04 A10: 7.998E−05
A12: −9.802E−06
ASP: 7th surface K: 2.711
A4: 2.337E−02 A6: 1.095E−01 A8: 2.495E−03 A10: 1.882E−03
A12: −2.538E−04
ASP: 8th surface K: 2.334
A4: −2.028E−01 A6: 1.984E−01 A8: −4.583E−03 A10: 1.053E−04
A12: −1.972E−03
ASP: 11th surface K: 2.640
A4: −4.360E−01 A6: 2.668E−02 A8: 1.415E−02 A10: −1.590E−03
A12: −4.297E−04
ASP: 14th surface K: −1.000
A4: −7.888E+00 A6: 1.278E+00 A8: −3.068E−01 A10: 5.052E−02
A12: −3.292E−03
ASP: 15th surface K: −1.000
A4: −1.017E+01 A6: 9.349E−01 A8: −3.407E−01 A10: 3.462E−02
A12: −1.329E−02

Figure 2:
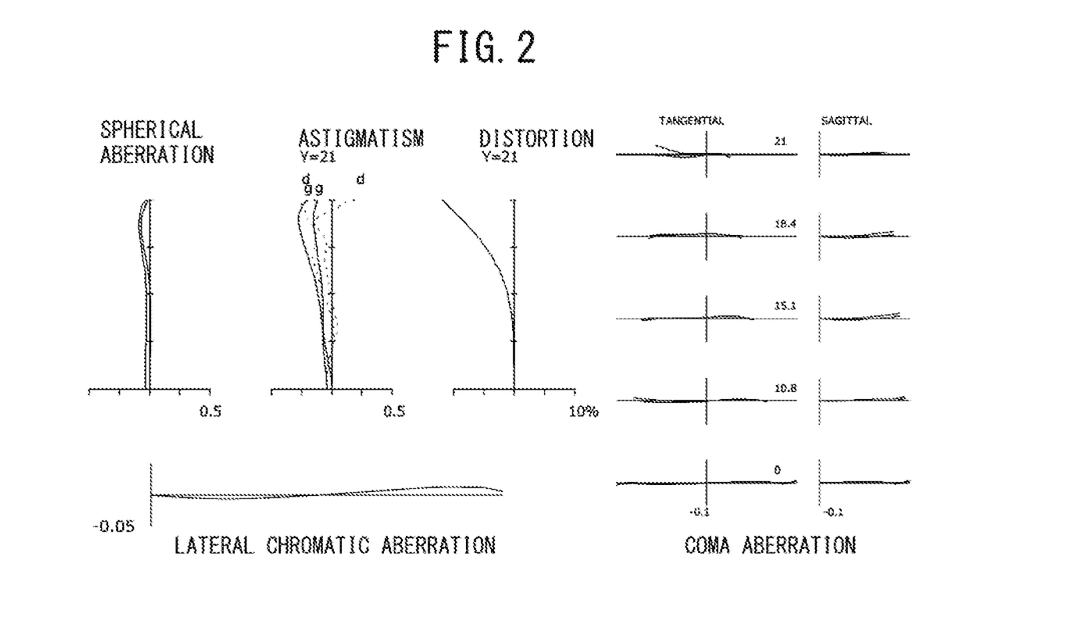
FIG. 2 illustrates aberrations of the optical system of the first example.

FIG. 2 illustrates aberrations of the optical system of the first example.

In the graphs of aberrations, Y, d, and g denote image height, d-line, and g-line (wavelength 435.8 nm), respectively. In the graph of astigmatism, the solid lines and the broken lines show a sagittal plane and a meridional plane, respectively. The reference symbols in the graphs of aberrations of the present example will also be used in those of the other examples described below.

The graphs of aberrations suggest that the optical system of the present example effectively reduces variations in aberrations at focusing and has high optical performance.

Second Example

Figure 3:
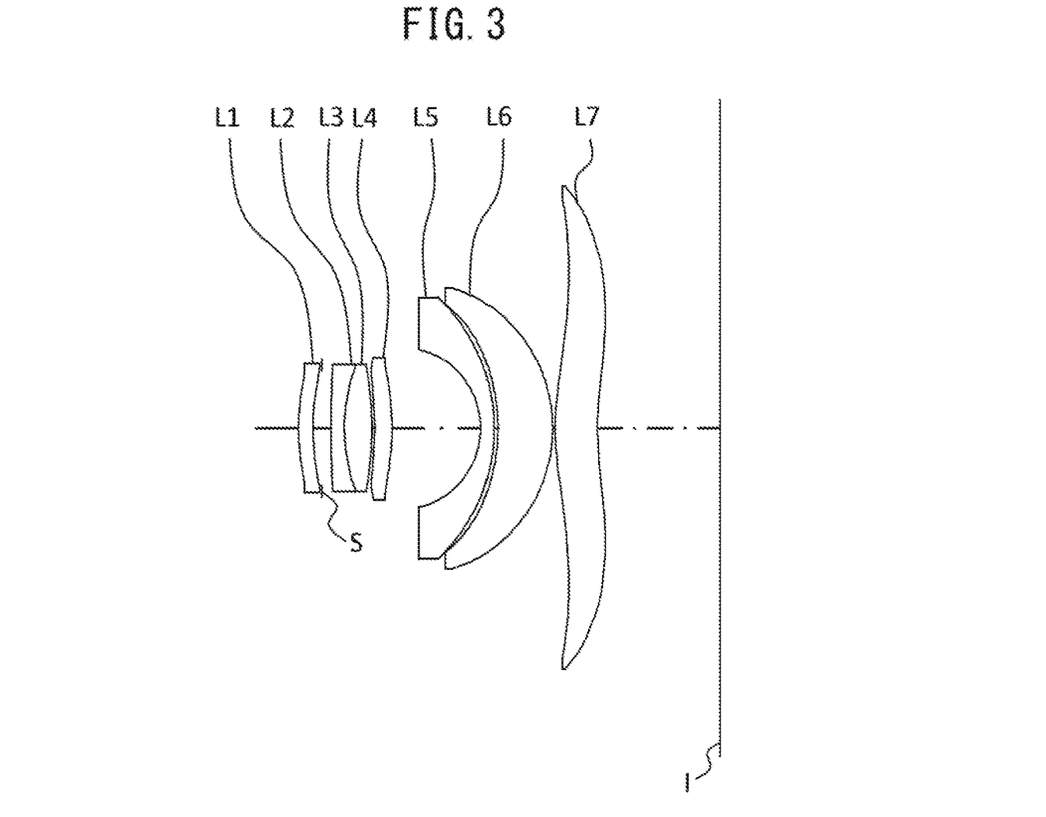
FIG. 3 is a cross-sectional view of an optical system of a second example.

FIG. 3 is a cross-sectional view of an optical system of a second example.

The optical system of the present example includes a positive meniscus lens L1 convex on the object side; an aperture stop S; a positive cemented lens composed of a negative meniscus lens L2 convex on the object side and a biconvex positive lens L3; a positive meniscus lens L4 convex on the image side; a negative meniscus lens L5 convex on the image side; a positive meniscus lens L6 convex on the image side; and a positive meniscus lens L7 convex on the object side, in order from the object side.

On an image plane I is disposed an imaging device (not shown) constructed from CCD, CMOS or the like.

In the present example, any of the object-side and image-side lens surfaces of the positive meniscus lens L7, which is the final lens, corresponds to the lens surface having a pole. The positive meniscus lens L6 corresponds to the lens being adjacent to the final lens on an object side and including a convex lens surface on the image side.

Table 2 below shows specifications of the optical system of the present example.

TABLE 2

| [General specifications] | |
|---|---|
| f | 24.300 |
| F. no | 2.900 |
| TL | 32.000 |
| BF | 9.155 |

[Lens specifications]

| m | r | d | nd | vd |
|---|---|---|---|---|
| * 1) | 13.5119 | 1.0958 | 1.883000 | 40.66 |
| * 2) | 15.2607 | 0.6592 | | |
| 3) | ∞ | 0.6807 | (aperture stop) | |
| 4) | 81.0326 | 1.0000 | 1.805180 | 25.45 |
| 5) | 12.4847 | 2.0628 | 1.883000 | 40.66 |
| 6) | −24.7146 | 0.2089 | | |
| * 7) | −19.9050 | 1.3001 | 1.531131 | 55.75 |
| * 8) | −17.0294 | 6.6125 | | |
| 9) | −5.7673 | 1.0000 | 1.805180 | 25.45 |
| 10) | −12.6568 | 0.2821 | | |
| * 11) | −12.6687 | 4.0784 | 1.902650 | 35.72 |
| 12) | −10.5913 | 0.2000 | | |
| * 13) | 18.8107 | 3.1764 | 1.834810 | 42.73 |
| * 14) | 24.4618 | BF | | |

[Aspherical surface data]

ASP: 1st surface

K: 1.000
A4: −1.791E−01 A6: −5.890E−03 A8: 8.428E−04 A10: −3.346E−06
ASP: 2nd surface K: 1.000
A4: −1.080E−01 A6: 1.229E−03 A8: 1.297E−03 A10: −7.201E−05
ASP: 7th surface K: 1.000
A4: 2.480E−01 A6: 1.113E−02 A8: 9.384E−04 A10: 1.182E−06
ASP: 8th surface K: 1.000
A4: 1.190E−01 A6: 5.031E−03 A8: 1.343E−03 A10: 1.521E−04
ASP: 11th surface K: 1.000
A4: 3.505E−02 A6: −1.555E−01 A8: 1.151E−02 A10: −6.365E−03
A12: 4.387E−04
ASP: 13th surface K: 1.000
A4: −8.483E+00 A6: 9.171E−01 A8: −2.954E−01 A10: 4.923E−02
A12: −8.286E−03
ASP: 14th surface K: 1.000
A4: −8.311E+00 A6: 8.403E−01 A8: −2.125E−01 A10: 3.306E−02
A12: −2.169E−03

Figure 4:
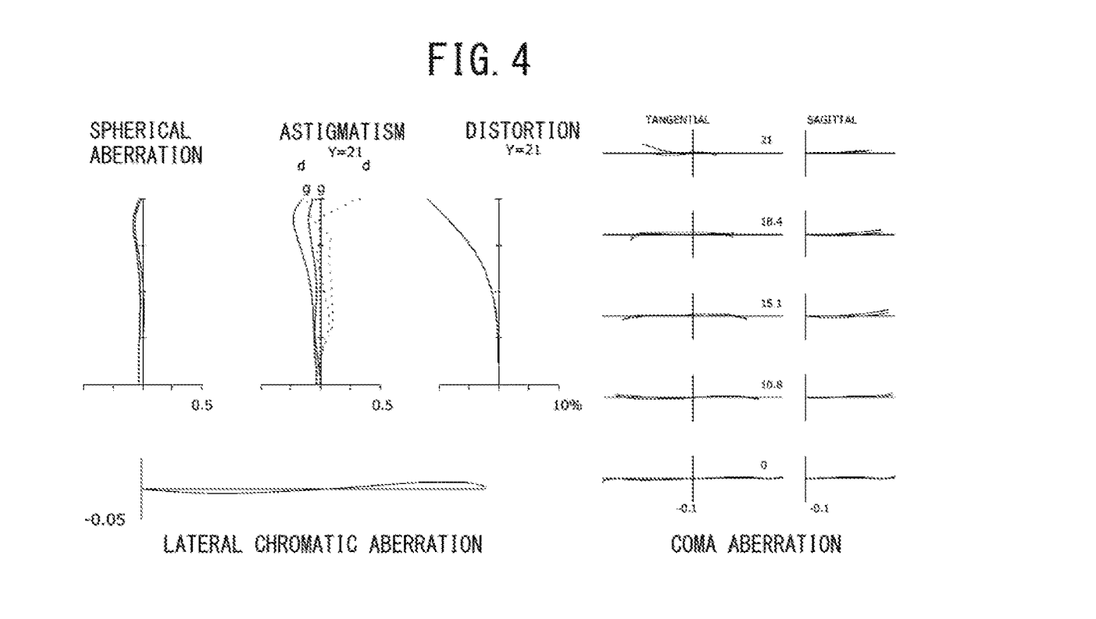
FIG. 4 illustrates aberrations of the optical system of the second example.

FIG. 4 illustrates aberrations of the optical system of the second example.

The graphs of aberrations suggest that the optical system of the present example effectively reduces variations in aberrations at focusing and has high optical performance.

Third Example

Figure 5:
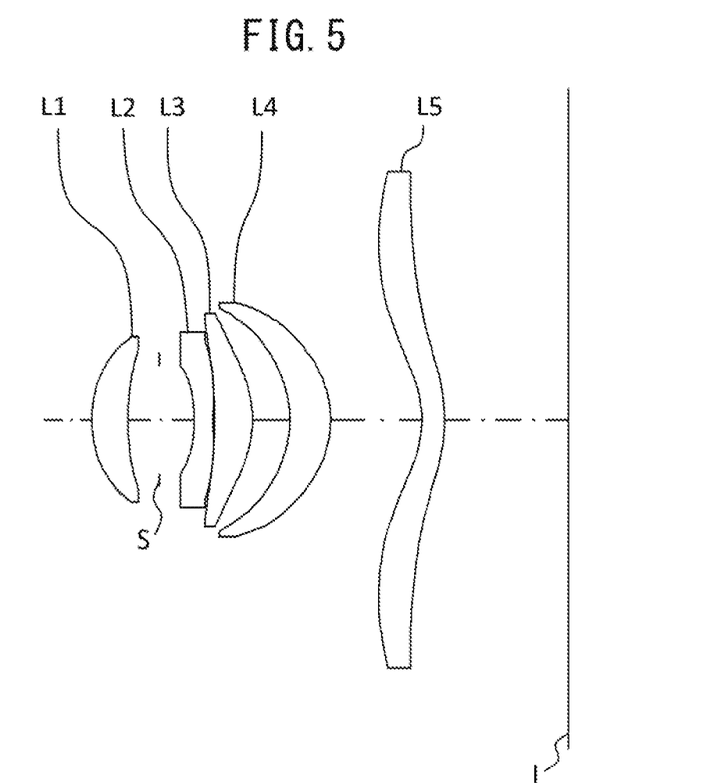
FIG. 5 is a cross-sectional view of an optical system of a third example.

FIG. 5 is a cross-sectional view of an optical system of a third example.

The optical system of the present example includes a positive meniscus lens L1 convex on the object side, an aperture stop S, a biconcave negative lens L2, a positive meniscus lens L3 convex on the image side, a positive meniscus lens L4 convex on the image side, and a negative meniscus lens L5 convex on the image side, in order from the object side.

On an image plane I is disposed an imaging device (not shown) constructed from CCD, CMOS or the like.

In the present example, the image-side lens surface of the negative meniscus lens L15, which is the final lens, corresponds to the lens surface having a pole. The positive meniscus lens L4 corresponds to the lens being adjacent to the final lens on an object side and including a convex lens surface on the image side.

Table 3 below shows specifications of the optical system of the present example.

TABLE 3

[General specifications]

| | |
|---|---|
| f | 26.100 |
| F. no | 2.800 |
| TL | 34.900 |
| BF | 9.499 |

[Lens specifications]

| m | r | d | nd | vd |
|---|---|---|---|---|
| * 1) | 7.9735 | 2.5958 | 1.496530 | 81.60 |
| * 2) | 17.5572 | 2.2466 | | |
| 3) | ∞ | 2.5273 | (aperture stop) | |
| * 4) | −11.8762 | 1.3628 | 1.803010 | 25.53 |
| * 5) | 48.4378 | 0.1000 | | |
| * 6) | −29.3534 | 2.7294 | 1.851080 | 40.12 |
| * 7) | −7.5502 | 2.6921 | | |
| * 8) | −7.1988 | 2.9336 | 1.592550 | 67.86 |
| * 9) | −6.7582 | 6.5655 | | |
| * 10) | −6.5626 | 1.6369 | 1.582860 | 59.50 |
| * 11) | −9.8500 | BF | | |

[Aspherical surface data]

ASP: 1st surface

K: 1.000
A4: −1.383E−04 A6: 2.107E−06 A8: 1.472E−07 A10: −1.845E−09
A12: 8.254E−11
ASP: 2nd surface K: 1.000
A4: 8.473E−05 A6: 4.994E−06 A8: −1.191E−07 A10: −2.781E−10
ASP: 4th surface K: 1.000
A4: −2.480E−03 A6: 5.503E−05 A8: −1.226E−06 A10: 5.471E−09
ASP: 5th surface K: 1.000
A4: −1.973E−03 A6: 5.858E−05 A8: −1.384E−06 A10: 1.763E−08
A12: 1.283E−11
ASP: 6th surface K: 1.000
A4: −1.603E−04 A6: 1.041E−05 A8: −1.983E−07 A10: 1.624E−09
A12: 8.810E−13
ASP: 7th surface K: 1.000
A4: 2.708E−04 A6: 1.439E−05 A8: 7.428E−08 A10: −1.097E−08
A12: 4.105E−10 A14: −7.576E−12 A16: 5.999E−14
ASP: 8th surface K: 0.000
A4: 5.331E−05 A6: 2.864E−07 A8: −1.000E−07 A10: −5.044E−09
A12: 3.184E−10 A14: −1.019E−11 A16: 1.966E−13 A18: −2.082E−15
A20: 9.465E−18
ASP: 9th surface K: 0.000
A4: −1.601E−04 A6: 2.442E−05 A8: −3.742E−06 A10: 2.828E−07
A12: −1.245E−08 A14: 3.290E−10 A16: −5.158E−12 A18: 4.424E−14
A20: −1.602E−16
ASP: 10th surface TABLE 3-continued K: 0.000
A4: 8.400E−04 A6: −5.506E−06 A8: 2.174E−08 A10: −4.520E−11
A12: 3.538E−14 A14: 6.348E−18 A16: 1.588E−21 A18: 1.170E−24
ASP: 11th surface K: 0.000
A4: 5.483E−04 A6: −3.557E−06 A8: 1.308E−08 A10: −2.421E−11
A12: 1.619E−14 A14: 2.182E−18 A16: 7.104E−22

Figure 6:
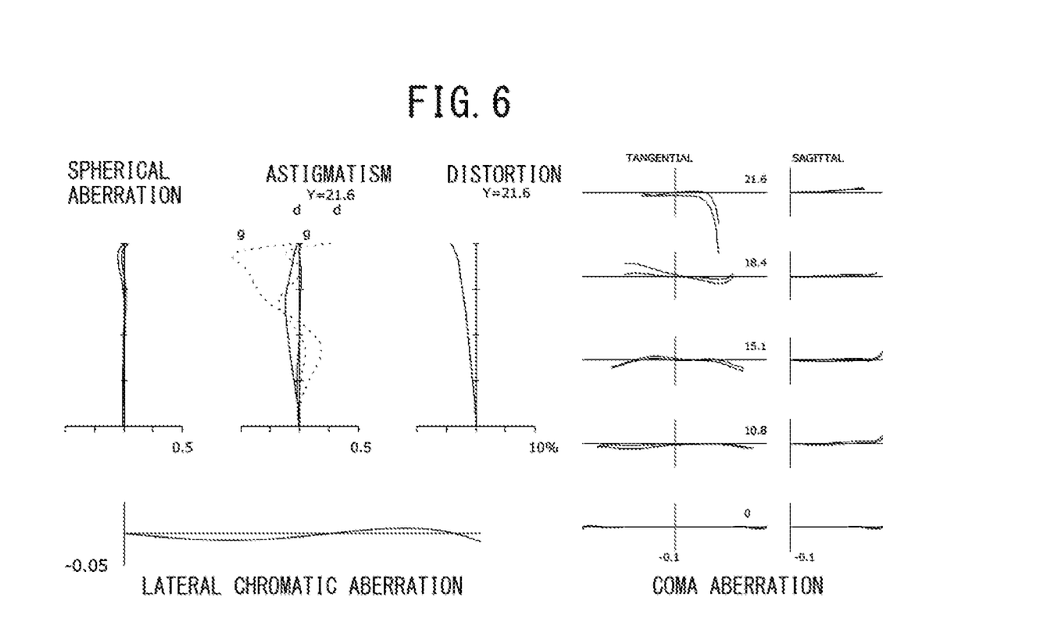
FIG. 6 illustrates aberrations of the optical system of the third example.

FIG. 6 illustrates aberrations of the optical system of the third example.

The graphs of aberrations suggest that the optical system of the present example effectively reduces variations in aberrations at focusing and has high optical performance.

Fourth Example

Figure 7:
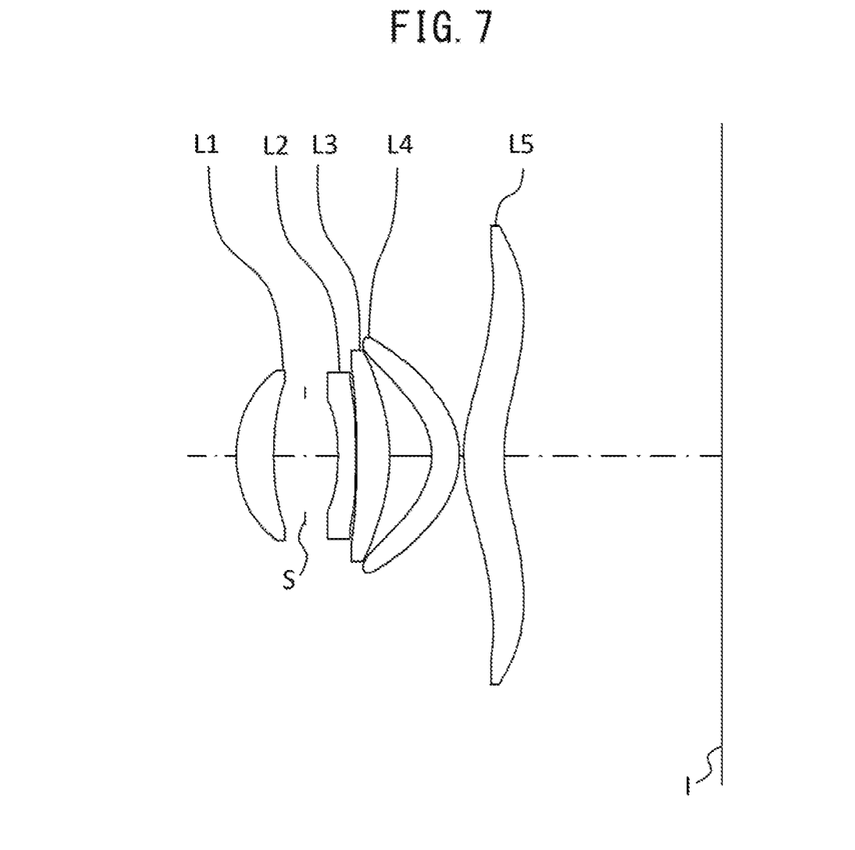
FIG. 7 is a cross-sectional view of an optical system of a fourth example.

FIG. 7 is a cross-sectional view of an optical system of a fourth example.

The optical system of the present example includes a positive meniscus lens L1 convex on the object side, an aperture stop S, a biconcave negative lens L2, a positive meniscus lens L3 convex on the image side, a negative meniscus lens L4 convex on the image side, and a positive meniscus lens L5 convex on the image side, in order from the object side.

On an image plane I is disposed an imaging device (not shown) constructed from CCD, CMOS or the like.

In the present example, any of the object-side and image-side lens surfaces of the positive meniscus lens L5, which is the final lens, corresponds to the lens surface having a pole. The negative meniscus lens L4 corresponds to the lens being adjacent to the final lens on an object side and including a convex lens surface on the image side.

Table 4 below shows specifications of the optical system of the present example.

TABLE 4

[General specifications]

| | |
|---|---|
| f | 26.100 |
| F. no | 2.800 |
| TL | 34.500 |
| BF | 15.829 |

[Lens specifications]

| m | r | d | nd | vd |
|---|---|---|---|---|
| * 1) | 7.8688 | 2.5958 | 1.496530 | 81.60 |
| * 2) | 17.0109 | 2.2011 | | |
| 3) | ∞ | 2.3071 | (aperture stop) | |
| * 4) | −14.0121 | 1.2000 | 1.803010 | 25.53 |
| * 5) | 590.3798 | 0.1000 | | |
| * 6) | −56.6588 | 2.3010 | 1.851080 | 40.12 |
| * 7) | −12.3357 | 2.9368 | | |
| * 8) | −4.2235 | 1.9321 | 1.592550 | 67.86 |
| * 9) | −5.3135 | 0.2970 | | |
| * 10) | 9.5557 | 2.8000 | 1.582860 | 59.50 |
| * 11) | 11.8342 | BF | | |

[Aspherical surface data]

ASP: 1st surface

K: 1.000
A4: 1.224E−04 A6: 1.992E−06 A8: 1.261E−07 A10: −1.674E−09
A12: 7.302E−11
ASP: 2nd surface TABLE 4-continued K: 1.000
A4: 8.139E−05 A6: 3.685E−06 A8: −9.945E−08 A10: −2.387E−10
ASP: 4th surface K: 1.000
A4: −1.485E−03 A6: 1.795E−05 A8: 6.598E−07 A10: −3.919E−08
ASP: 5th surface K: 1.000
A4: −1.125E−03 A6: 1.613E−05 A8: 2.975E−07 A10: −5.584E−09
A12: −3.355E−12
ASP: 6th surface K: 1.000
A4: −1.057E−04 A6: 8.550E−06 A8: −2.901E−07 A10: 2.575E−09
ASP: 7th surface K: 1.000
A4: −2.212E−04 A6: 2.897E−05 A8: −7.025E−07 A10: 5.398E−09
ASP: 8th surface K: 0.000
A4: 5.098E−04 A6: −5.568E−06 A8: −2.911E−08 A10: 2.709E−09
ASP: 9th surface K: 0.000
A4: 7.123E−05 A6: −4.068E−06 A8: 4.738E−08 A10: −3.221E−10
ASP: 10th surface K: 0.000
A4: −6.898E−04 A6: 6.309E−06 A8: −3.665E−08 A10: 1.124E−10
A12: −1.354E−13 A14: −1.179E−17 A16: −5.204E−22
A18: 5.042E−24
ASP: 11th surface K: 0.000
A4: −5.221E−04 A6: 3.795E−06 A8: −1.797E−08 A10: 4.229E−11
A12: −3.753E−14 A14: 4.499E−18 A16: 1.131E−21

Figure 8:
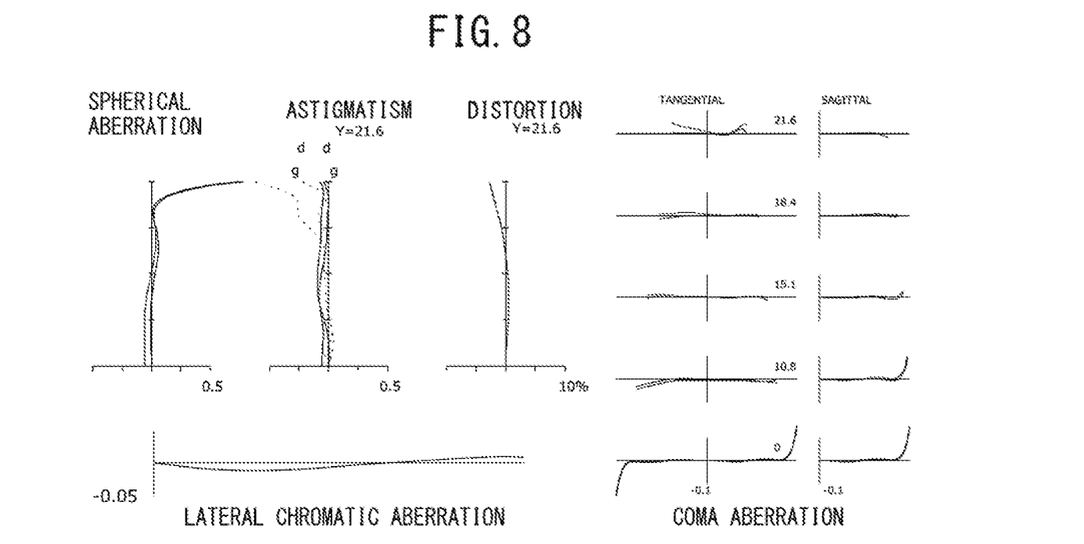
FIG. 8 illustrates aberrations of the optical system of the fourth example.

FIG. 8 illustrates aberrations of the optical system of the fourth example.

The graphs of aberrations suggest that the optical system of the present example effectively reduces variations in aberrations at focusing and has high optical performance.

An optical system of high optical performance that effectively reduces variations in aberrations at focusing can be achieved according to the above examples.

The following are a list of the conditional expressions and the values for the conditional expressions in the examples.

[List of Conditional Expressions]

| | |
|---|---|
| (1) | k/h |
| (2) | f/fk |
| (3) | f/TL |
| (4) | f²/TL |
| (5-1) | PPo/PCo |
| (5-2) | PPi/PCi |
| (6-1) | PPbo/PCbo |
| (6-2) | PPbi/PCbi |
| (7) | 1/q |
| (8) | SL/TL |
| (9) | BF |
| (10) | BF/f |
| (11) | TL/BF |
| (12) | nd |

[Values for Conditional Expressions]

| | Example 1 | Example 2 | Example 3 | Example 4 |
|---|---|---|---|---|
| (1) | 0.277 | 0.271 | 0.311 | 0.336 |
| (2) | 0.125 | 0.313 | −0.632 | 0.445 |
| (3) | 0.722 | 0.759 | 0.748 | 0.757 |
| (4) | 16.313 | 18.453 | 19.519 | 19.745 |
| (5-1) | −1.124 | −1.081 | −0.354 | −0.589 |
| (5-2) | −1.180 | −2.129 | −0.196 | −1.225 |
| (6-1) | 0.622 | 1.647 | 0.751 | 0.006 |
| (6-2) | 1.000 | 1.000 | 0.846 | 0.300 |
| (7) | −0.425 | −0.089 | −0.032 | 0.114 |
| (8) | 0.921 | 0.947 | 0.861 | 0.861 |
| (9) | 9.186 | 9.155 | 9.499 | 15.829 |
| (10) | 0.406 | 0.377 | 0.364 | 0.606 |
| (11) | 3.408 | 3.495 | 3.674 | 2.180 |
| (12) | 1.883 | 1.903 | 1.851 | 1.851 |

The above examples illustrate specific examples of the present invention, and the present invention is not limited thereto. The following details can be appropriately employed unless the optical performance of the optical system of the embodiment of the present application is lost.

The f-number of the optical system of the present embodiment is approximately f/2.9.

The lens surfaces of the lenses constituting any of the optical systems of the above examples may be covered with antireflection coating having high transmittance in a wide wavelength range. This reduces flares and ghosts, and enables achieving optical performance with high contrast.

Figure 9:
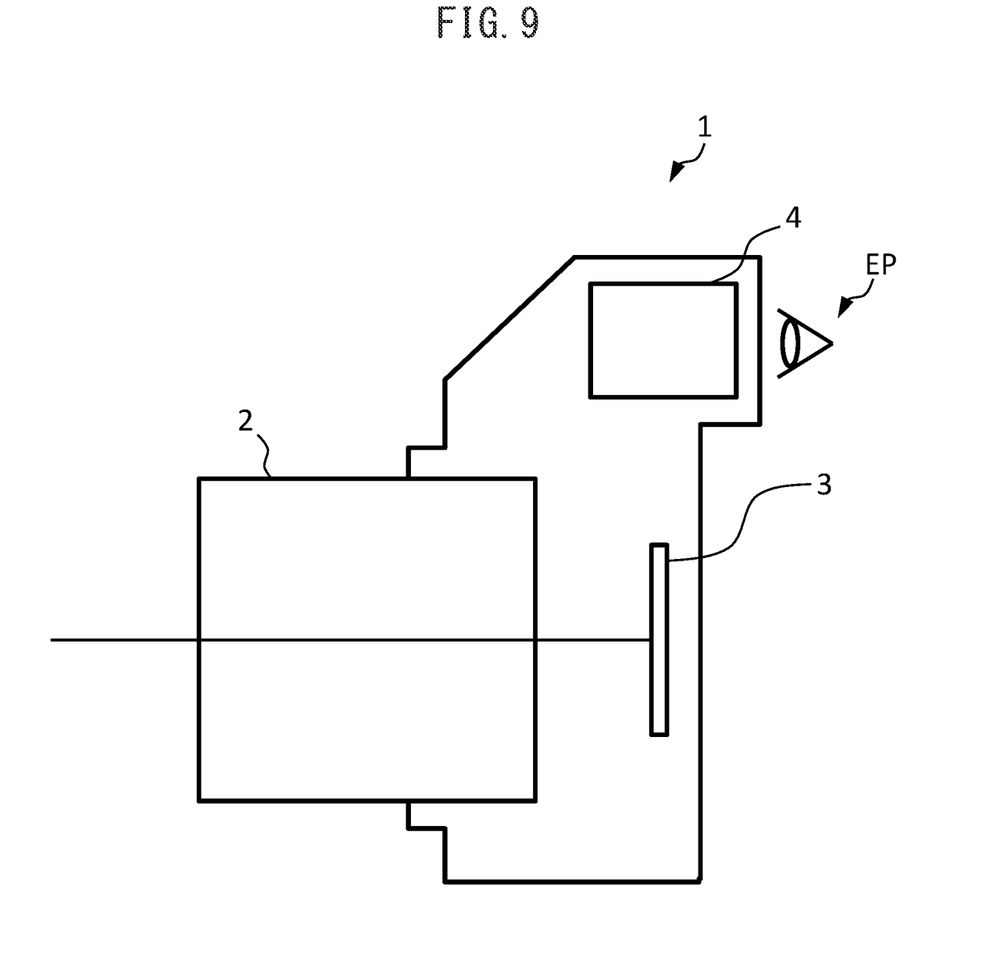
FIG. 9 schematically illustrates a camera including an optical system of the embodiment.

Next, a camera including the optical system of the present embodiment is described with reference to FIG. 9. FIG. 9 schematically illustrates a camera including the optical system of the present embodiment.

The camera 1 is a "mirror-less camera" of an interchangeable lens type including the optical system according to the first example as an imaging lens 2.

In the camera 1, light from an object (subject) (not shown) is condensed by the imaging lens 2, and reaches an imaging device 3. The imaging device 3 converts the light from the subject to image data. The image data is displayed on an electronic view finder 4. This enables a photographer who positions his/her eye at an eye point EP to observe the subject.

When a release button (not shown) is pressed by the photographer, the image data is stored in a memory (not shown). In this way, the photographer can take a picture of the subject with the camera 1.

The optical system of the first example included in the camera 1 as the imaging lens 2 is a small-sized optical system of favorable optical performance. Thus the camera 1 can effectively reduce variations in aberrations at focusing and achieve high optical performance. A camera configured by including any one of the optical systems of the second to fourth examples as the imaging lens 2 can have the same effect as the camera 1.

Figure 10:
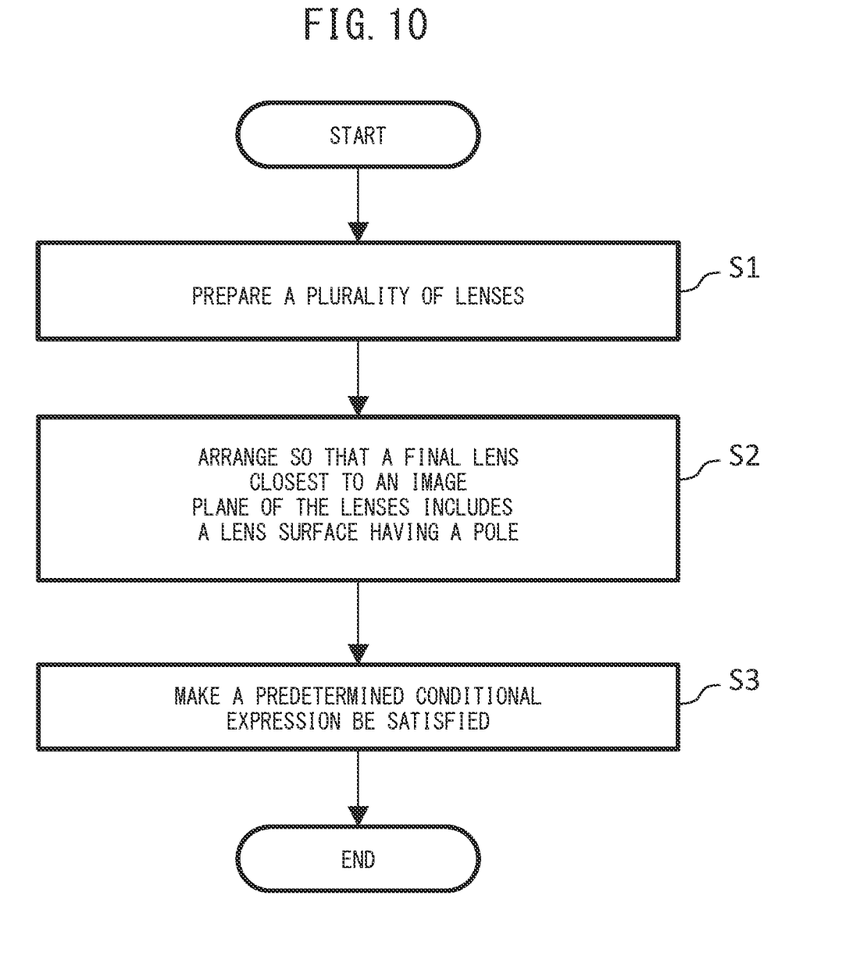
FIG. 10 is a flowchart outlining a method for manufacturing an optical system of the embodiment.

Finally, a method for manufacturing an optical system of the present embodiment is described in outline with reference to FIG. 10.

FIG. 10 is a flowchart outlining a method for manufacturing an optical system of the present embodiment.

The method for manufacturing an optical system of the present embodiment shown in FIG. 10 includes the following steps S1, S2, and S3:

Step S1: preparing a plurality of lenses;
Step S2: arranging so that a final lens closest to an image plane of the lenses includes a lens surface having a pole; and
Step S3: making the optical system satisfy the following conditional expression (1):

$$0.200 < k/h < 0.500 \quad (1)$$

where
k denotes the height of the pole from an optical axis, and
h denotes the effective radius of the lens surface having a pole.

A small-sized optical system of favorable optical performance can be manufactured by the method for manufacturing an optical system of the present embodiment.

Note that those skilled in the art can make various changes, substitutions, and modifications without departing from the spirit and scope of the present invention.

REFERENCE SIGNS LIST

L1-L8 lenses
S aperture stop
I image plane

The invention claimed is:

1. An optical system comprising:
five or more lenses; and
an aperture stop disposed closer to an image side than a lens component disposed closest to an object side,
wherein
a final lens closest to the image side of the five or more lenses includes a lens surface having a pole, and
the following conditional expressions are satisfied:

$$0.20<k/h<0.50$$

$$0.50<f/TL<0.78$$

where
k denotes the height of the pole from an optical axis,
h denotes the effective radius of the lens surface having a pole,
f denotes the focal length of the whole optical system, and
TL denotes the total optical length of the whole optical system.

2. The optical system according to claim 1, wherein the following conditional expression is satisfied:

$$-1.00<f/fk<1.00$$

where
fk denotes the focal length of the lens having a pole, and
f denotes the focal length of the whole optical system.

3. The optical system according to claim 1, wherein the following conditional expression is satisfied:

$$10.00<f^2/TL$$

where
f denotes the focal length (mm) of the whole optical system, and
TL denotes the total optical length (mm) of the whole optical system.

4. The optical system according to claim 1, wherein the following conditional expression is satisfied:

$$-3.00<PPo/PCo<-0.01$$

where
PPo denotes refractive power at a position where a principal ray at a maximum image height passes through an object-side lens surface for the case that the final lens has a pole on the object-side lens surface, and
PCo denotes refractive power near the center of the object-side lens surface for the case that the final lens has a pole on the object-side lens surface.

5. The optical system according to claim 1, wherein the following conditional expression is satisfied:

$$-3.00<PPi/PCi<-0.01$$

where
PPi denotes refractive power at a position where a principal ray at a maximum image height passes through an image-side lens surface for the case that the final lens has a pole on the image-side lens surface, and
PCi denotes refractive power near the center of the image-side lens surface for the case that the final lens has a pole on the image-side lens surface.

6. The optical system according to claim 1, wherein the following conditional expression is satisfied:

$$-0.20<PPbo/PCbo<2.00$$

where
PPbo denotes refractive power at a position where a principal ray at a maximum image height passes through an object-side lens surface of a lens adjacent to the final lens on an object side, and
PCbo denotes refractive power near the center of the object-side lens surface of the lens adjacent to the final lens on the object side.

7. The optical system according to claim 1, wherein the following conditional expression is satisfied:

$$-0.20<PPbi/PCbi<2.00$$

where
PPbi denotes refractive power at a position where a principal ray at a maximum image height passes through an image-side lens surface of a lens adjacent to the final lens on an object side, and
PCbi denotes refractive power near the center of the image-side lens surface of the lens adjacent to the final lens on the object side.

8. The optical system according to claim 1, wherein the following conditional expression is satisfied:

$$-1.00<1/q<1.00$$

where
q denotes the shape factor of a lens being adjacent to the final lens on an object side and including a convex lens surface on the image side.

9. The optical system according to claim 1, wherein the lens surface of the final lens having a pole has a positive curvature near the pole.

10. The optical system according to claim 1, further comprising an aperture stop, wherein the following conditional expression is satisfied:

$$0.80<SL/TL<1.00$$

where
SL denotes the length in the optical system from the aperture stop to an image plane, and
TL denotes the total optical length of the whole optical system.

11. The optical system according to claim 1, wherein the following conditional expression is satisfied:

$$5.00<BF$$

where
BF denotes the distance (mm) from a final lens surface to an image plane.

12. The optical system according to claim 1, wherein the following conditional expression is satisfied:

$$0.30<BF/f<0.70$$

where
BF denotes the back focus of the optical system, and
f denotes the focal length of the whole optical system.

13. The optical system according to claim 1, wherein the following conditional expression is satisfied:

1.50<$TL/BF$<5.00 where
TL denotes the total optical length of the whole optical system, and
BF denotes the back focus of the optical system.

14. The optical system according to claim 1, wherein the following conditional expression is satisfied:

1.70<$nd$ where
nd denotes the highest of refractive indices of lenses included in the optical system.

15. The optical system according to claim 1, comprising at least one cemented lens.

16. An optical apparatus equipped with the optical system according to claim 1.

17. A method for manufacturing an optical system comprising:
five or more lenses; and
an aperture stop disposed closer to an image side than a lens component disposed closest to an object side,
wherein
a final lens closest to an image plane of the five or more lenses includes a lens surface having a pole,
the method comprising one of features (A) or (B),
wherein the feature (A) comprises:
satisfying the following conditional expressions:

0.20<$k/h$<0.50

0.50<$f/TL$<0.78 where
k denotes the height of the pole from an optical axis, and
h denotes the effective radius of the lens surface having a pole,
f denotes the focal length of the whole optical system, and
TL denotes the total optical length of the whole optical system, and
wherein the feature (B) comprises:
satisfying the following conditional expressions:

0.20<$k/h$<0.50

0.30<$BF/f$<0.70 where
k denotes the height of the pole from an optical axis,
h denotes the effective radius of the lens surface having a pole,
BF denotes the back focus of the optical system, and
f denotes the focal length of the whole optical system.

18. An optical system comprising:
five or more lenses; and
an aperture stop disposed closer to an image side than a lens component disposed closest to an object side,
wherein
a final lens closest to the image side of the five or more lenses includes a lens surface having a pole, and
the following conditional expressions are satisfied:

0.20<$k/h$<0.50

0.30<$BF/f$<0.70 where
k denotes the height of the pole from an optical axis,
h denotes the effective radius of the lens surface having a pole,
BF denotes the back focus of the optical system, and
f denotes the focal length of the whole optical system.

* * * * *